(12) United States Patent
Yang

(10) Patent No.: US 6,830,206 B2
(45) Date of Patent: Dec. 14, 2004

(54) GRINDER FOR PEPPER GRAINS, SPICES, COFFEE BEANS OR THE LIKE

(76) Inventor: Heng-Te Yang, P.O. Box 90, Tainan City (TW)

(*) Notice: Subject to any disclaimer, the term of this patent is extended or adjusted under 35 U.S.C. 154(b) by 152 days.

(21) Appl. No.: 10/372,258

(22) Filed: Feb. 25, 2003

(65) Prior Publication Data

US 2004/0164193 A1 Aug. 26, 2004

(51) Int. Cl.[7] .......................... A01D 34/90; A47J 42/00; A47J 43/00
(52) U.S. Cl. ..................... 241/169.1; 241/168; 241/258
(58) Field of Search ............................. 241/168, 169.1, 241/258

(56) References Cited

U.S. PATENT DOCUMENTS 3,734,417 A * 5/1973 Russell et al. .............. 241/168
4,685,625 A * 8/1987 Mazza ......................... 241/36
4,925,150 A * 5/1990 Tedioli ..................... 241/169.1
5,022,591 A * 6/1991 Sanders ................... 241/169.1

* cited by examiner

Primary Examiner—Allen Ostrager
Assistant Examiner—Jason Y Pahng

(57) ABSTRACT

A grinder for pepper grains, spices, coffee beans or the like in the invention has a body, a motor seat, an engagement plate, a revolving seat, a base, a battery seat and a cover. When a press button of the cover is depressed, electricity-conducting pieces of the battery seat will be pressed to come into contact with each other to form an open electric circuit, by which a motor will be actuated to rotate a reducing gear assembly of the motor seat so that a gear of the reducing gear assembly will be rotated to turn a journal to swivel a spindle to turn a grinding member, thereby enabling the grinder to proceed with an automatic grinding operation. When the body and the revolving seat are rotated by a user with hands, the grinding member will be turned around accordingly to make the grinder proceed with a manual grinding operation.

4 Claims, 5 Drawing Sheets

GRINDER FOR PEPPER GRAINS, SPICES, COFFEE BEANS OR THE LIKE

BACKGROUND OF THE INVENTION

1. Field of the Invention

This invention relates to a grinder for pepper grains, spices, coffee beans or the like, particularly to one mainly composed of a body, a motor seat, an engagement plate, a revolving seat, a base, a battery seat and a cover. When a press button of the cover is depressed by a user, electricity-conducting pieces of the battery seat will be pressed to come into contact with each other to form an open electric circuit, by which a motor of the motor seat will be actuated to rotate a reducing gear assembly of the motor seat so that a gear of the reducing gear assembly will be rotated to turn a journal to swivel a spindle to turn a grinding member, thereby enabling the grinder to proceed with an automatic grinding operation. When the body and the revolving seat are rotated by a user with both hands, the grinding member will be turned around accordingly so as to make the grinder proceed with a manual grinding operation, which is very convenient in use.

2. Description of the Prior Art

Generally speaking, as shown in FIG. 1, a known conventional grinder 1 mainly has a base 10, a container body 11 disposed above the base 10, and a cover 12 covered on a top of the container body 11. The container body 11 has a fixing seat 13 secured at a lower portion thereof. A spindle 14 has an upper portion coupled to the fixing seat 13 and a lower portion connected with a grinding member 15. The grinding member 15 is received in a grinding seat 16 secured in the base 10. In using, firstly place the material to be ground into the container body 11, such as pepper grains, spices or coffee beans. And then, hold the base 10 and the container body 11 respectively with both hands and rotate them in two opposite directions so that the material placed between grinding teeth of the grinding seat 16 and the grinding member 15 that are engaged with each other can be ground into powder and fallen out of a lower end of the base 10. However, such manually operated grinder 1 is labor-consuming and time-consuming when grinding larger quantity of materials. Moreover, users often feel very uncomfortable in hands after using such grinder 1 for a longer time.

SUMMARY OF THE INVENTION

The main purpose of the invention is to offer a grinder capable of grinding pepper grains, spices, coffee beans or the like electrically or manually.

The main feature of the invention is to provide a grinder for pepper grains, spices, coffee beans or the like mainly including:

a body having a compartment, the compartment provided with a first stepped engagement edge and a second stepped engagement edge respectively disposed in an upper portion and a lower portion thereof;

a motor seat accommodated in the compartment of the body, the motor seat having at least two engagement holes respectively disposed in a sidewall thereof, a motor disposed thereon, a chamber disposed in a lower portion thereof, a reducing gear assembly disposed in the chamber, and a positioning seat fixed at a bottom thereof, the motor provided with an axle extended into the chamber and a driving gear coupled to the axle and meshed with the reducing gear assembly, the positioning seat provided with a through hole for being extended through by a gear of the reducing gear assembly;

an engagement plate attached to the second stepped engagement edge of the body and secured to a bottom of the positioning seat of the motor seat, the engagement plate having a through hole disposed in a center thereof;

a revolving seat capable of being joined to the lower portion of the body, and having a flange disposed at an upper portion thereof and a flanged ring disposed at a bottom thereof;

a base secured to the bottom of the revolving seat, and having a recess, a fixing seat, a grinding seat, a grinding member, a spindle, a journal, a bottom shell, an adjusting knob as well as a spring, the recess provided with a through hole disposed therein, the fixing seat fixed on the recess and provided with an aperture disposed therein, a plurality of fixing ribs disposed above the aperture as well as a spindle hole supported by the plurality of fixing ribs, the grinding seat secured to a lower portion of the fixing seat, the grinding member received in the grinding seat and provided with a hole, the spindle capable of being extended through the hole of the grinding member as well as the spindle hole of the fixing seat and inserted into the journal, the journal having an upper portion provided with a driven gear and a lower portion capable of being extended through the through hole of the engagement plate, the bottom shell fixed in the base and provided with a threaded hole disposed therein as well as a plurality of through holes disposed therein, the adjusting knob capable of being sleeved by the spring and screwed with the threaded hole of the bottom shell;

a battery seat mounted on the motor seat and accommodated in the compartment of the body, the battery seat having at least two electricity-conducting pieces disposed on an upper portion thereof, a plurality of battery chambers disposed therein for accommodating batteries, and at least two engagement blocks respectively disposed on an outer surface of a wall of a lower portion thereof; and, a cover covered on a top of the body and connected with the battery seat, the cover having a through hole disposed at a top thereof, a press button capable of being extended out of the through hole, a spring sleeved on a lower portion of the press button, and a fixing plate fixed in the cover and provided with a hole for being extended through by a lower end of the press button.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
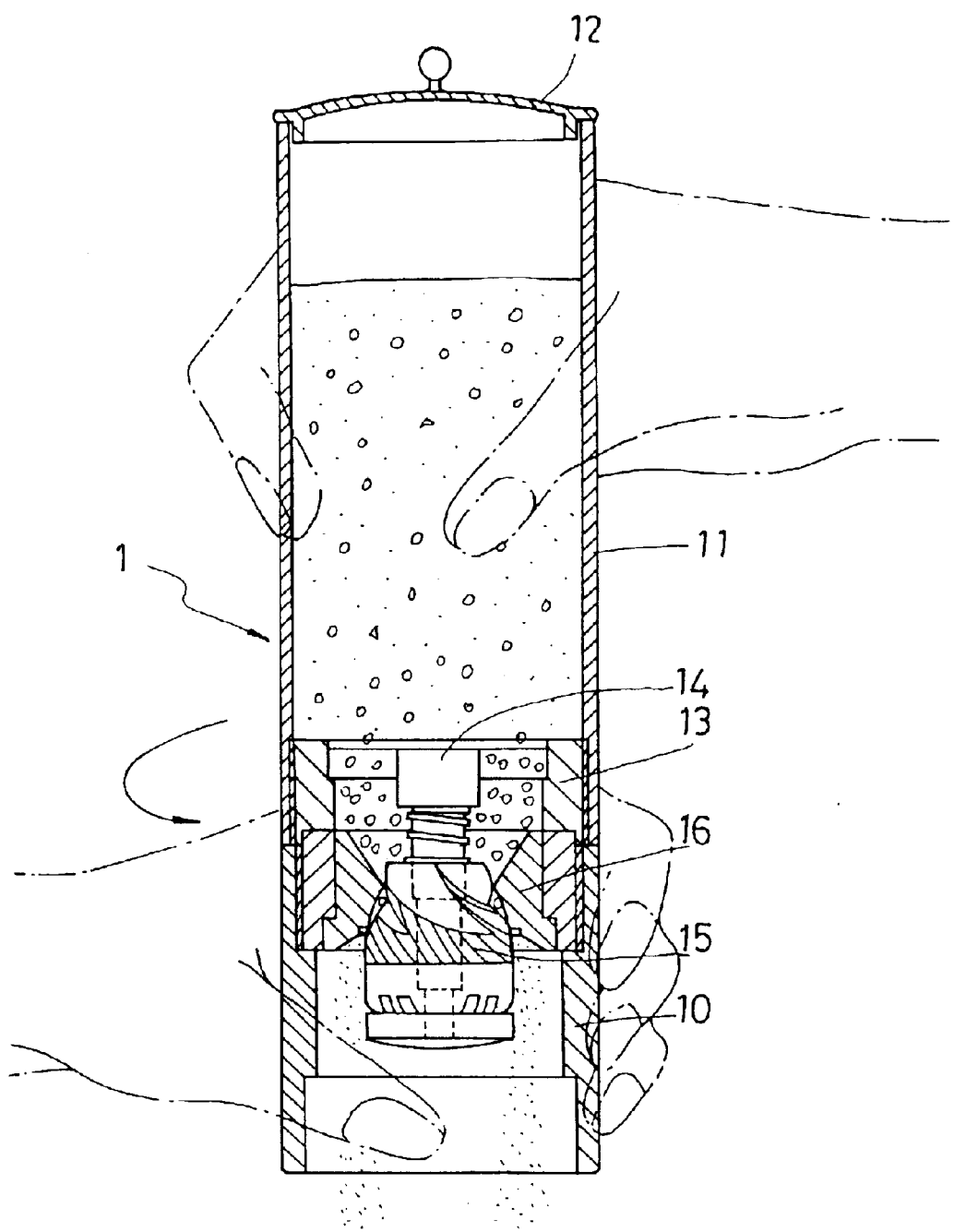
FIG. 1 is a schematic view of a known conventional grinder in use.
Figure 2:
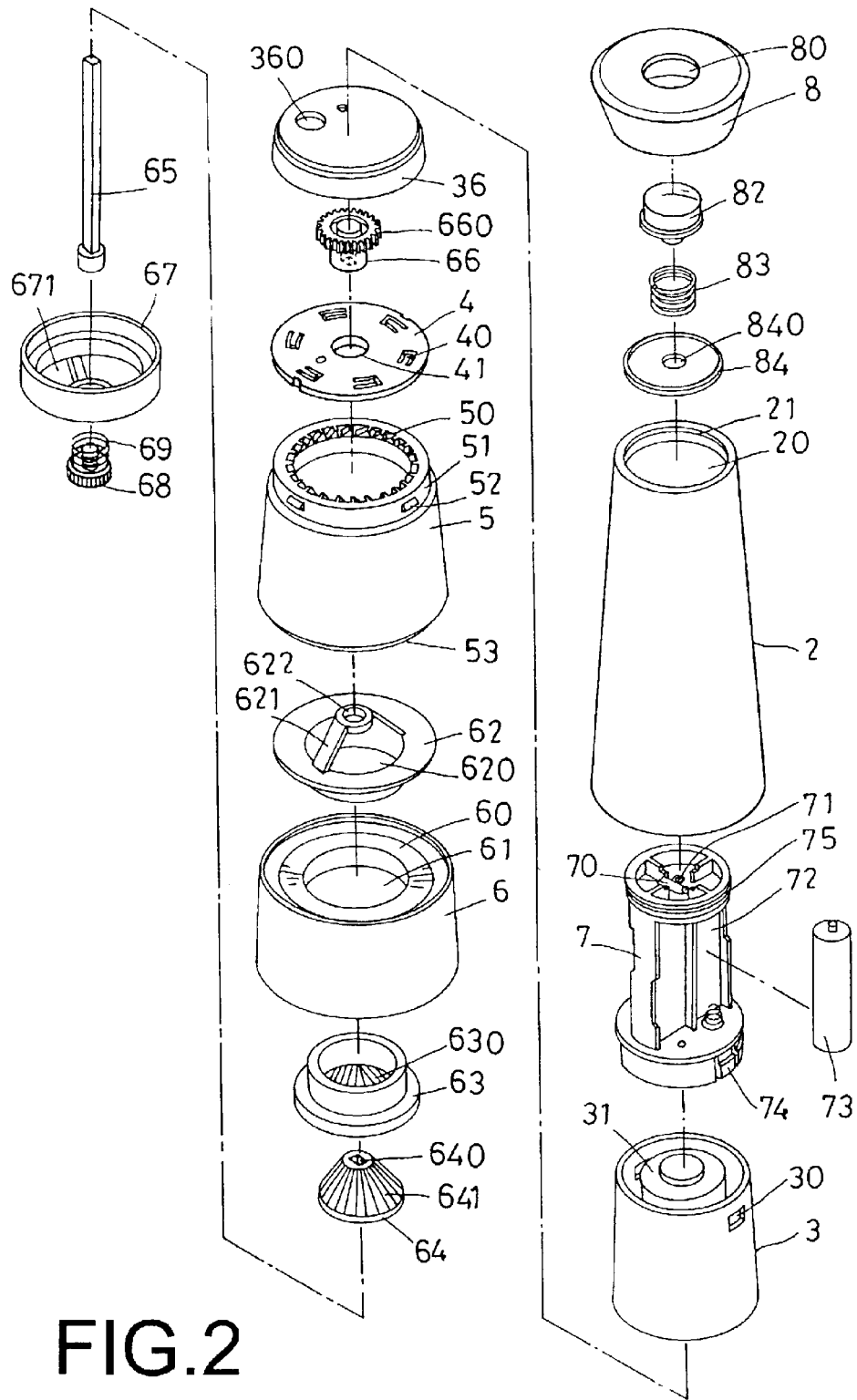
FIG. 2 is an exploded perspective view of a grinder for pepper grains, spices, coffee beans or the like in the present invention.
Figure 3:
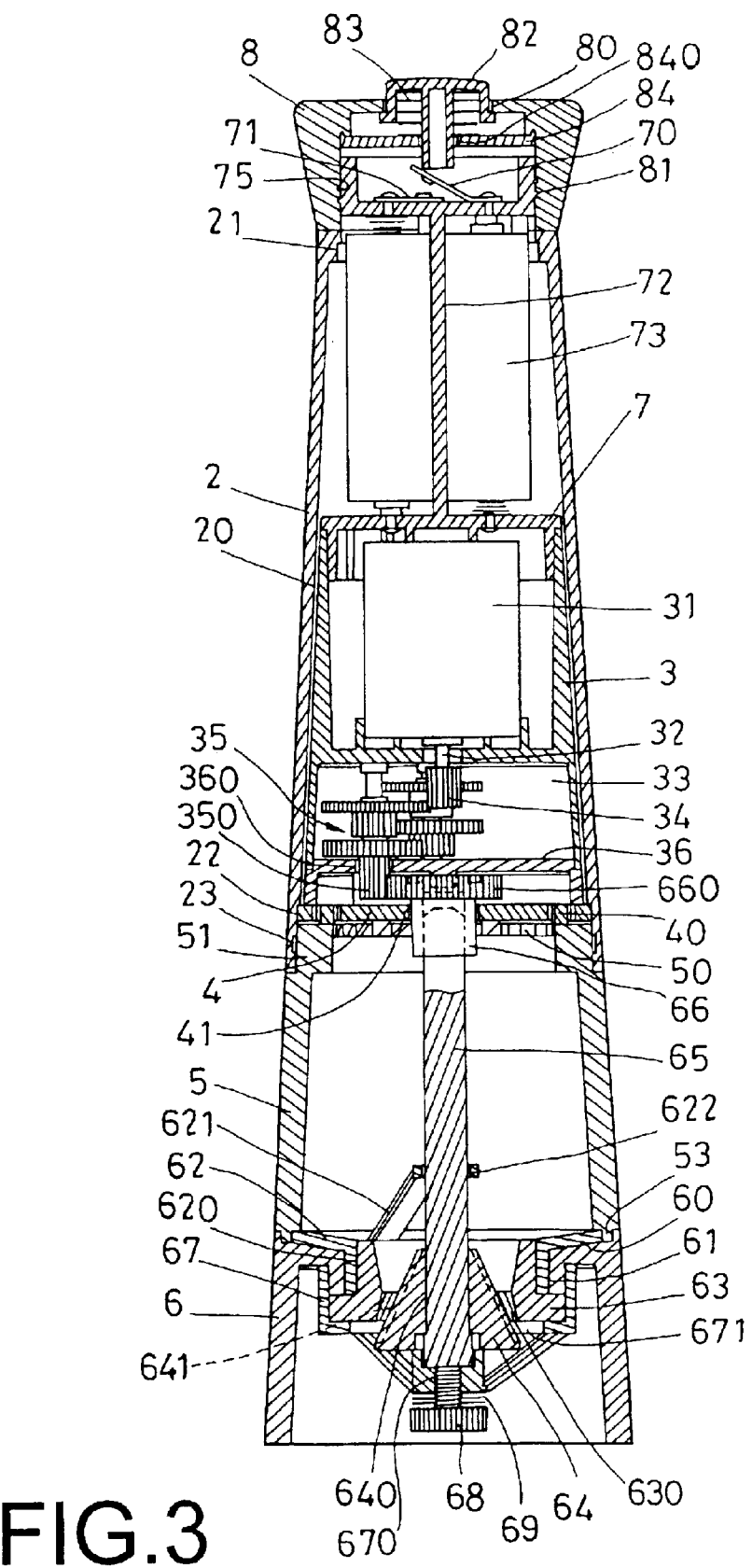
FIG. 3 is a sectional view showing an assemblage of the grinder for pepper grains, spices, coffee beans or the like in the present invention.
Figure 4:
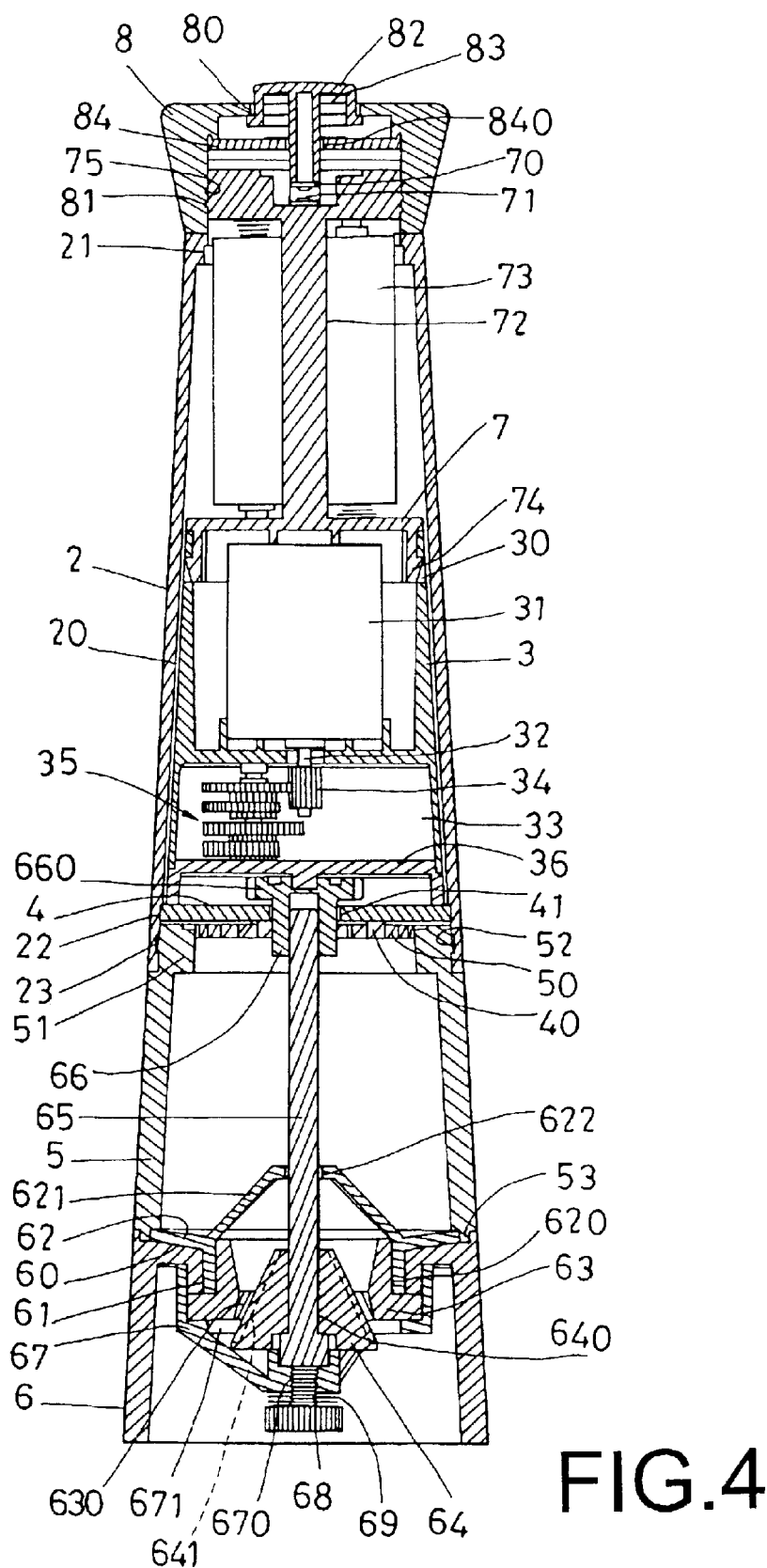
FIG. 4 is another sectional view showing the assemblage of the grinder for pepper grains, spices, coffee beans or the like in the present invention; and, FIG. 5 is a schematic view of the grinder for pepper grains, spices, coffee beans or the like in the present invention, showing a press button being depressed to make the grinder proceed with an automatic grinding operation.

A preferred embodiment of a grinder for pepper grains, spices, coffee beans or the like in the present invention, as shown in FIGS. 2, 3 and 4, mainly includes a body 2, a motor seat 3, an engagement plate 4, a revolving seat 5, a base 6, a battery seat 7 and a cover 8.

The body 2 has a compartment 20 provided with a first stepped engagement edge 21 as well as a second stepped engagement edge 22 respectively disposed in an upper portion and a lower portion thereof, and a ring groove 23 disposed near a bottom thereof.

The motor seat 3 accommodated in the compartment 20 of the body 2 has two engagement holes 30 disposed in a sidewall thereof, a motor 31 disposed thereon, a chamber 33 disposed in a lower portion thereof, a reducing gear assembly 35 disposed in the chamber 33, and a positioning seat 36 fixed at a bottom thereof. The motor 31 is provided with an axle 32 extended into the chamber 33, and a driving gear 34 coupled to the axle 32 and meshed with the reducing gear assembly 35. The positioning seat 36 is provided with a through hole 360 for being extended through by a gear 350 of the reducing gear assembly 35.

The engagement plate 4 is attached to the second stepped engagement edge 22 of the body 2 and secured to a bottom of the positioning seat 36 of the motor seat 3. The engagement plate 4 has a plurality of elastic engagement teeth 40 protruded downwards therefrom, and a though hole 41 disposed in a center thereof.

The revolving seat 5 capable of being joined to the lower portion of the body 2 has a plurality of engagement grooves 50 disposed in a top thereof, a flange 51 disposed at an upper portion thereof, a plurality of engagement blocks 52 disposed on an outer surface of a wall of the flange 51, and a flanged ring 53 disposed at a bottom thereof.

The base 6 secured to the bottom of the revolving seat 5 has a recess 60, a fixing seat 62, a grinding seat 63, a grinding member 64, a spindle 65, a journal 66, a bottom shell 67, an adjusting knob 68 and a spring 69. The recess 60 is provided with a through hole 61 disposed in a center thereof. The fixing seat 62 fixed on the recess 60 is provided with an aperture 620 disposed in a center thereof, a plurality of fixing ribs 621 disposed above the aperture 620, and a spindle hole 622 supported by the plurality of fixing ribs 621. The grinding seat 63 is secured to a lower portion of the fixing seat 62 and provided with a plurality of grinding teeth 630 disposed on an inner surface of a wall thereof. The grinding member 64 received in the grinding seat 63 is provided with a hole 640, and a plurality of grinding teeth 641 disposed on an outer surface of a wall thereof. The spindle 65 is capable of being extended through the hole 640 of the grinding member 64 and the spindle hole 622 of the fixing seat 62, and inserted into the journal 66. The journal 66 has an upper portion provided with a driven gear 660, and a lower portion capable of being extended through the through hole 41 of the engagement plate 4. The bottom shell 67 fixed in the base 6 is provided with a threaded hole 670 disposed in a center thereof and a plurality of through holes 671 disposed therein. The adjusting knob 68 is capable of being sleeved by the spring 69 and screwed with the threaded hole 670 of the bottom shell 67.

The battery seat 7 mounted on the motor seat 3 and accommodated in the compartment 20 of the body 2 has a first and a second electricity-conducting pieces 70, 71 disposed on an upper portion thereof, a plurality of battery chambers 72 disposed at both sides thereof for accommodating batteries 73, two engagement blocks 74 respectively disposed on an outer surface of a wall of a lower portion thereof, and external threads 75 disposed on an outer surface of a wall of the upper portion thereof.

The cover 8 covered on a top of the body 2 and connected with the battery seat 7 has a through hole 80 disposed at a top thereof, internal threads 81 disposed on an inner surface thereof for being screwed with the external threads 75 of the battery seat 7, a press button 82 capable of being extended out of the through hole 80, a spring 83 sleeved on a lower portion of the press button 82, and a fixing plate 84 fixed in the cover 8 and provided with a hole 840 for being extended through by a lower end of the press button 82.

In assembling, referring to FIGS. 2, 3 and 4, firstly fix the positioning seat 36 at the bottom of the motor set 3 with the gear 350 of the reducing gear assembly 35 extended through the through hole 360 of the positioning seat 36, and then weld the positioning seat 36 to the bottom of the motor set 3 by an ultrasonic apparatus. Secondly, insert the batteries 73 into the battery chambers 72 of the battery seat 7, and mount the battery seat 7 on the motor set 3 with the two engagement blocks 74 of the battery seat 7 respectively engaged in the two engagement holes 30 of the motor seat 3. Thirdly, extend the low portion of the journal 66 through the through hole 41 of the engagement plate 4 with the driven gear 660 of the journal 66 meshed with the gear 350 of the reducing gear assembly 35, and then weld the engagement plate 4 to the bottom of the positioning seat 36 of the motor seat 3 by an ultrasonic apparatus. Fourthly, place the abovementioned assembled components into the compartment 20 of the body 2 with the engagement plate 4 attached to the second stepped engagement edge 22 of the body 2 and with the upper portion of the battery seat 7 extended out of the upper portion of the body 2. Fifthly, fix the fixing seat 62 of the base 6 on the recess 60 of the base 6, and then secure the grinding seat 63 to the lower portion of the fixing seat 62. Sixthly, extend the spindle 65 through the hole 640 of the grinding member 64 and the spindle hole 622 of the fixing seat 62 with the grinding member 64 that is coupled to a lower portion of the spindle 65 received in the grinding seat 63, and then fix the bottom shell 67 in the base 6. Seventhly, sleeve the spring 69 around the adjusting knob 68, and then screw the adjusting knob 68 with the threaded hole 670 of the bottom shell 67 to make the adjusting knob 68 pressed upwardly against a lower end of the spindle 65. Eighthly, place the base 6 beneath the revolving seat 5 and weld the base 6 to the bottom of the revolving seat 5 by an ultrasonic apparatus with the spindle 65 extended into the revolving seat 5. And then, join the revolving seat 5 to the lower portion of the body 2 with the plurality of engagement blocks 52 of the flange 51 of the revolving seat 5 respectively engaged in the ring groove 23 of the body 2 in a way allowing the revolving seat 5 to be swiveled beneath the body 2. Ninthly, combine the press button 82 and the spring 83 in the cover 8 with the press button 82 extended out of the through hole 80 of the cover 8, and then weld the fixing plate 84 in the cover 8 by an ultrasonic apparatus with the lower end of the press button 82 extended through the hole 840 of the fixing plate 84. Finally, screw the cover 8 with the external threads 75 of the battery seat 7 to make the cover 8 covered on the top of the body 2, by which an assemblage of the whole structure of the grinder in the present invention is completed.

Figure 5:
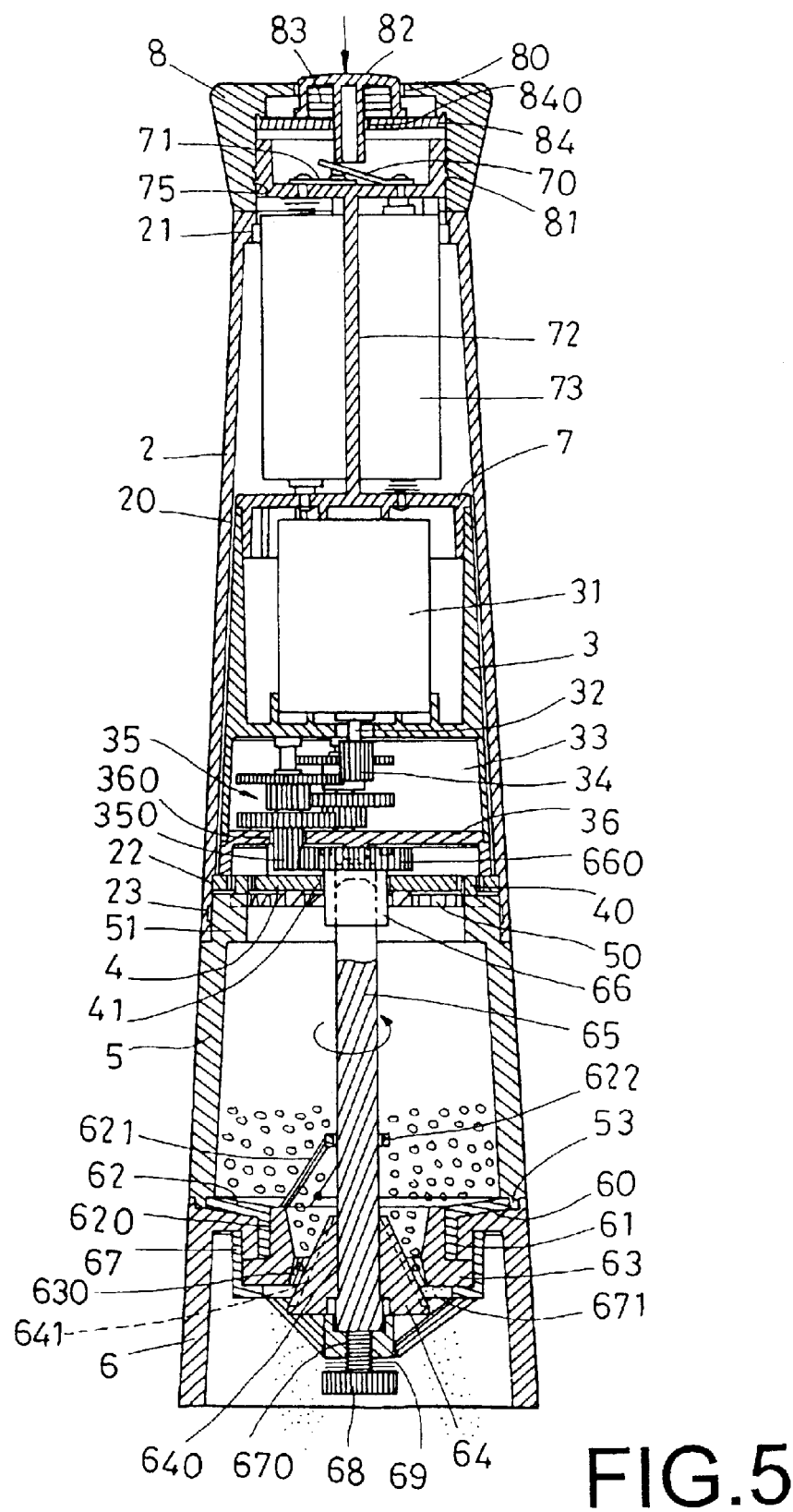

In using, referring to FIG. 5, firstly disassemble the revolving seat 5 from the body 2 with a separating force, and then place the material to be ground into the revolving seat 5, such as pepper grains, spices or coffee beans. Secondly, reassemble the revolving seat 5 and the body 2 together with the spindle 65 inserted into the journal 66.

When the press button 82 of the cover 8 is depressed to compress the spring 83 downwards, the first electricity-conducting piece 70 of the battery seat 7 will be pressed by the lower end of the press button 82 to come into contact with the second electricity-conducting piece 71 to form an open electric circuit, by which the motor 31 of the motor seat 3 will be actuated to make the axle 32 turn the driving gear 34 to rotate the reducing gear assembly 35 that is meshed with the driving gear 34 so that the gear 350 of the reducing gear assembly 35 will be rotated to turn the driven gear 660 of the journal 66 that is meshed with the gear 350 to swivel the spindle 65 to turn the grinding member 64 that is coupled to the lower portion of the spindle 65 to grind the material positioned between the external teeth 641 of the grinding member 64 and the internal teeth 630 of the grinding seat 63, thereby enabling the grinder to proceed with an automatic grinding operation.

When the body 2 and the revolving seat 5 are respectively rotated in two opposite directions by a user with one hand holding the body 2 and the other hand holding the revolving seat 5, the journal 66 will be rotated to swivel the spindle 65 to turn the grinding member 64 around accordingly so as to make the grinder proceed with a manual grinding operation, which is very convenient in use. Moreover, an engagement of the plurality of elastic engagement teeth 40 of the engagement plate 4 and the plurality of engagement grooves 50 of the revolving seat 5 can greatly reinforce the grinding capacity.

Furthermore, an adjustment of the adjusting knob 68 to press the spindle 65 up or down is capable of moving the grinding member 64 up or down accordingly to adjust the gap between the grinding member 64 and the grinding seat 63, thereby allowing the material to be ground into powder of different sizes.

While the preferred embodiment of the invention has been described above, it will be recognized and understood that various modifications may be made therein and the appended claims are intended to cover all such modifications that may fall within the spirit and scope of the invention.

What is claimed is:

1. A grinder for pepper grains, spices, coffee beans or the like comprising:

a body having a compartment, said compartment provided with a first stepped engagement edge and a second stepped engagement edge respectively disposed in an upper portion and a lower portion thereof;

a motor seat accommodated in said compartment of said body, said motor seat having at least two engagement holes disposed in a sidewall thereof, a motor disposed thereon, a chamber disposed in a lower portion thereof, a reducing gear assembly disposed in said chamber, and a positioning seat fixed at a bottom thereof, said motor provided with an axle extended into said chamber and a driving gear coupled to said axle and meshed with said reducing gear assembly, said positioning seat provided with a through hole for being extended through by a gear of said reducing gear assembly;

an engagement plate attached to said second stepped engagement edge of said body and secured to a bottom of said positioning seat of said motor seat, said engagement plate having a through hole disposed in a center thereof;

a revolving seat capable of being joined to said lower portion of said body, and having a flange disposed at an upper portion thereof and a flanged ring disposed at a bottom thereof;

a base secured to said bottom of said revolving seat, and having a recess, a fixing seat, a grinding seat, a grinding member, a spindle, a journal, a bottom shell, an adjusting knob as well as a spring, said recess provided with a through hole disposed therein, said fixing seat fixed on said recess and provided with an aperture disposed therein, a plurality of fixing ribs disposed above said aperture as well as a spindle hole supported by said plurality of fixing ribs, said grinding seat secured to a lower portion of said fixing seat, said grinding member received in said grinding seat and provided with a hole, said spindle capable of being extended through said hole of said grinding member as well as said spindle hole of said fixing seat and inserted into said journal, said journal having an upper portion provided with a driven gear and a lower portion capable of being extended through said through hole of said engagement plate, said bottom shell fixed in said base and provided with a threaded hole disposed therein as well as a plurality of through holes disposed therein, said adjusting knob capable of being sleeved by said spring and screwed with said threaded hole of said bottom shell;

a battery seat mounted on said motor seat and accommodated in said compartment of said body, said battery seat having at least two electricity-conducting pieces disposed on an upper portion thereof, a plurality of battery chambers disposed therein for accommodating batteries, and at least two engagement blocks respectively disposed on an outer surface of a wall of a lower portion thereof;

a cover covered on a top of said body and connected with said battery seat, said cover having a through hole disposed at a top thereof, a press button capable of being extended out of said through hole, a spring sleeved on a lower portion of said press button, and a fixing plate fixed in said cover and provided with a hole for being extended through by a lower end of said press button; and, whereby when said press button of said cover is depressed by a user, said electricity-conducting pieces of said battery seat will be pressed to come into contact with each other to form an open electric circuit, by which said motor will be actuated to rotate said reducing gear assembly so that said gear of said reducing gear assembly will be rotated to turn said journal to swivel said spindle to turn said grinding member, thereby enabling said grinder to proceed with an automatic grinding operation; when said body and said revolving seat are rotated by a user with both hands, said grinding member will be turned around accordingly so as to make said grinder proceed with a manual grinding operation.

2. The grinder for pepper grains, spices, coffee beans or the like as claimed in claim 1, wherein said engagement plate has a plurality of elastic engagement teeth protruded downwards therefrom; wherein said revolving seat has a plurality of engagement grooves disposed in a top thereof for being engaged with said plurality of elastic engagement teeth of said engagement plate.

3. The grinder for pepper grains, spices, coffee beans or the like as claimed in claim 1, wherein said body has a ring groove disposed near a bottom of said compartment thereof; wherein said revolving seat has a plurality of engagement blocks respectively disposed on an outer surface of a wall of said flange thereof for being engaged in said ring groove of said body.

4. The grinder for pepper grains, spices, coffee beans or the like as claimed in claim 1, wherein said battery seat has external threads disposed on an outer surface of a wall of said upper portion thereof; wherein said cover has internal threads disposed on an inner surface thereof for being screwed with said external threads of said battery seat.

* * * * *